United States Patent [19]

Rydborn

[11] 4,025,797
[45] May 24, 1977

[54] APPARATUS FOR DETECTING THE MOVEMENT OF ONE OR MORE OBJECTS

[76] Inventor: Sten-Ake Olaus Rydborn, Kloxhultsvagen 21, Almhult, Sweden

[22] Filed: Oct. 17, 1975

[21] Appl. No.: 623,275

[30] Foreign Application Priority Data

Oct. 18, 1974 Sweden ............................ 7413176

[52] U.S. Cl. .............................. 307/116; 340/282; 340/248 R
[51] Int. Cl.² ....................................... G08B 21/00
[58] Field of Search .................. 340/282, 248 R; 307/130, 116, 117, 118, 38, 41; 317/DIG. 2, 123, 140

[56] References Cited

UNITED STATES PATENTS

| | | | |
|---|---|---|---|
| 3,032,754 | 5/1962 | Pietro | 340/282 |
| 3,062,997 | 11/1962 | Loyd, Jr. | 340/282 |
| 3,717,863 | 2/1973 | Kempen et al. | 340/248 R |

Primary Examiner—Herman J. Hohauser
Attorney, Agent, or Firm—Beveridge, DeGrandi, Kline & Lunsford

[57] ABSTRACT

Apparatus for detecting movement of threads, strips or like objects, including a signal generating device for each object. Each device generates an electric signal in the presence of an object at a predetermined point, and the devices are coupled one at a time to a signal indication apparatus by means of an input coupling device.

21 Claims, 16 Drawing Figures

| 20 | 21 | 22 | 23 | 24 | 25 | 26 | 27 | 28 | 29 | 20 | 21 | 22 |

APPARATUS FOR DETECTING THE MOVEMENT OF ONE OR MORE OBJECTS

The present invention relates to an apparatus for detecting the movement at a predetermined point, of one or more objects, for example, threads, strips or the like, the apparatus including a signal generating device for each object, the devices being arranged to generate an electric signal in the presence of an object at the predetermined point.

Known apparatuses for detecting the movement or presence of an object, so-called knock-off action devices for detecting threads, strips or the like in different machines operating with these materials, such as looms, winding machines of different types, cabling machines etc., are possessed of various disadvantages which have militated against the use of such apparatuses, despite the fact that the absence of such an apparatus results, in many cases, in a product of a poorer quality. Thus, the art stands in need of an improved apparatus of the above type which, to a greater extent, prevents false operational stoppages because of, for example, bouncing threads or the like, these false operational stoppages being common in prior art apparatuses. Moreover, in many contexts, it is desirable to be able to detect a plurality of objects and, with one and the same apparatus, to detect an optionally selected number of objects, and, moreover, to be able to change the selected number of objects from one machine-running to the next, if desired.

These needs are satisfied according to the present invention in that the signal generating devices of the apparatus, described above are coupled one-at-time to a signal indication apparatus by means of an input coupling device.

An embodiment of the present invention will be described in greater detail hereinbelow with reference to the accompanying drawings on which.

Figure 1A:
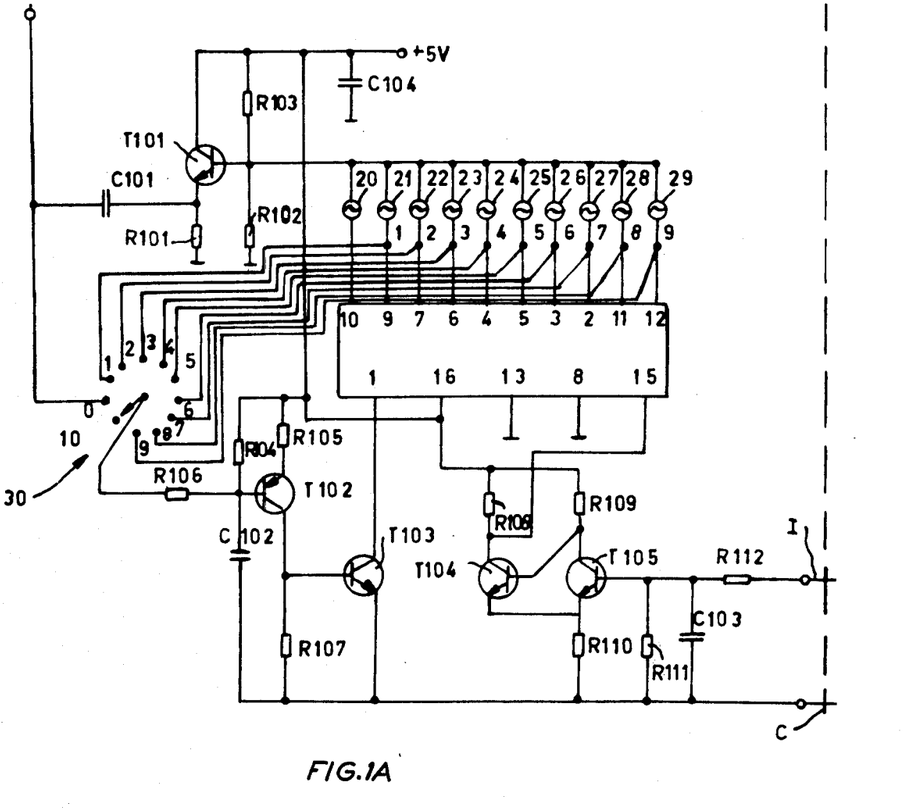
FIGS. 1A–1C show a coupling diagram of an embodiment of an apparatus according to the present invention.
Figure 1B:
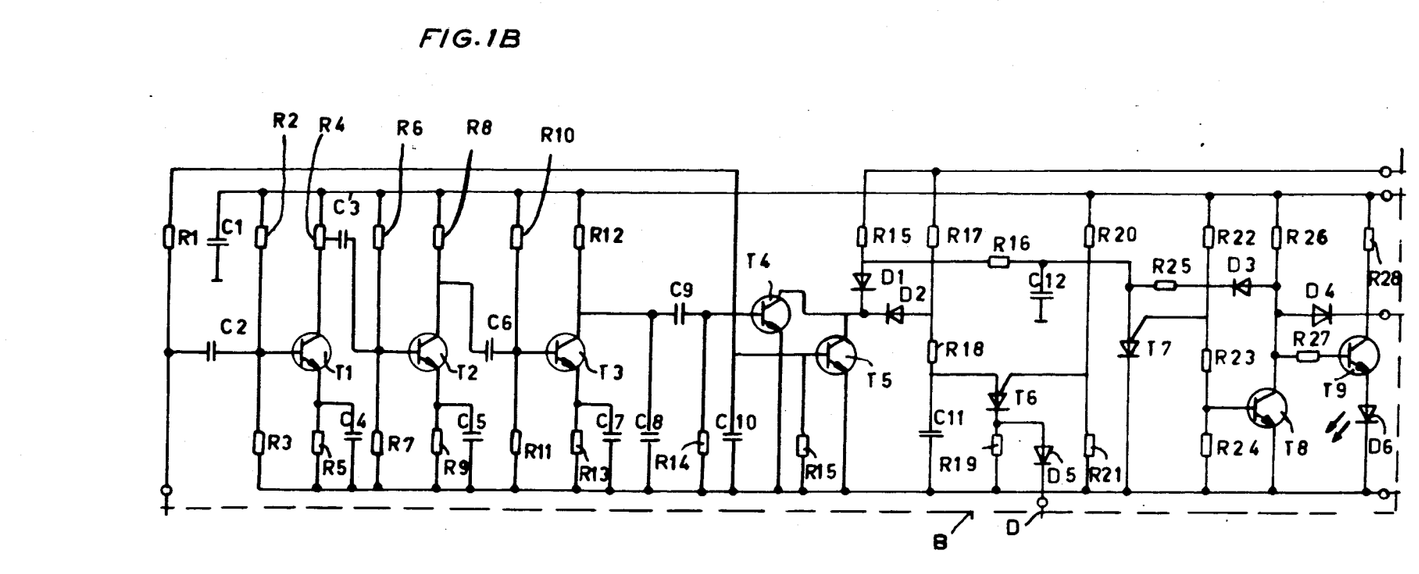
Figure 1C:
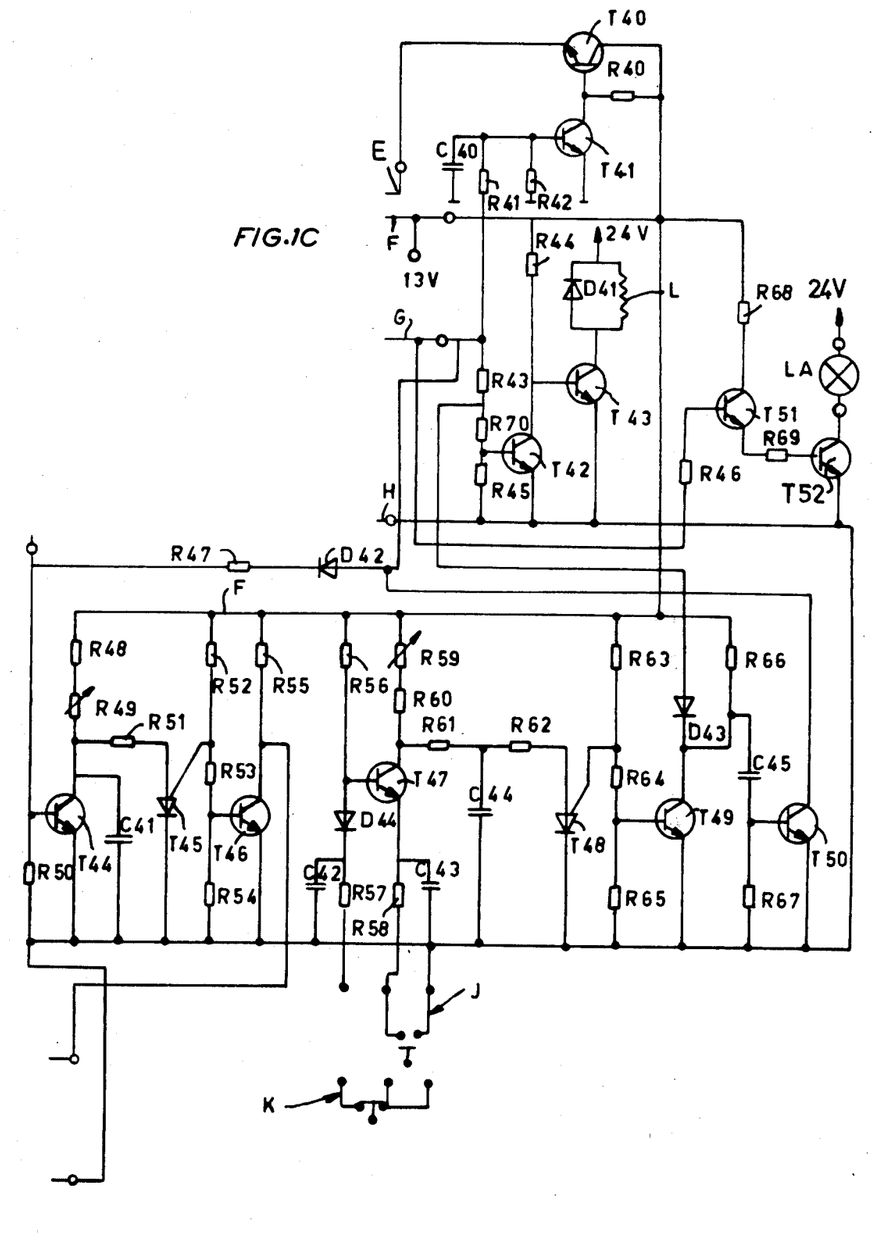

The embodiment of the present invention described below is intended for use in a machine working with threads, naturally, however, the invention should not in any way be considered as restricted to such machines, it being possible to use the apparatus in any type of machine which works with threads, strips or the like. The embodiment shown in FIG. 1 is an operationally usable embodiment. The broken lines A-B-C-D-E shown in FIG. 1 give the following practical division of the diagram. The section demarcated by lines A-B and B-c can be considered as a signal generating section or signal transmitter section and is arranged at that point where the thread or threads are to be detected in the machine. This section is in communication with the remaining sections by means of some suitable type of cable which is connected to the section by means of plug contacts at A, C, I and +5V. In the present case, this signal transmitter is intended for the detection of ten threads, as will be described in more detail below. However, if it is desired to detect more than ten threads, the machine can be provided with several such signal transmitters. The section demarcated by line A–E can be considered as a signal indication section and one such signal indication section should be present for each signal transmitter. The section demarcated by lines B–C and B–E is common to all signal generating and signal indication sections of the machine and can be taken to include a trigger section which is coupled in at E, F, G and H and a stepping pulse generator section and actuation section, which is connected at D, G and H and the remaining illustrated fixed connection points. The illustrated division is also for circuit cards and the connection points A, C, D, E, F, G, H and I are of a type suitable for circuit cards. In FIG. 1 there is also shown two alternative switching circuits J and K with the same function, but J has a closing function and K has an opening function. The functions of these switches will be illustrated in more detail below.

It should be observed, however, that there is a relay in the operational circuit of the machine which may be switched to the one-state by means of a relay coil L shown in the accompanying coupling diagram. When the coil L is energized by a current, the relay is held in the on-state and running of the machine is permitted. However, as soon as the current in the relay coil L ceases, the relay becomes inoperative, the operation of the machine is discontinued and the switch J is closed. As soon as the machine is to be started, the switch J is opened and as a result the relay coil L will be energized by current, so that the relay is moved to the on-state. This will be illustrated in more detail below.

In the present case, the signal transmitter is intended for ten threads and has, therefore, ten eyes 20–29, the threads to be detected running through and eventually touching the eyes. A piezoelectric crystal is fixed on each of the eyes 20–29 for generating an electric signal when the eye is activated by a thread or the like. On one side, the crystals are coupled to each other and to the base of a transistor T101, which is coupled as an emitter follower. The other side of each of the crystals is coupled to its respective output 10, 9, 7, 6, 4, 5, 3, 2, 11, 12 from a stepping device IC101, which, in the present case, is in the form of a counter of the SN74142 type from Texas Instruments and which, has apart from the outputs (whose designation corresponds to the designation on the data sheet as do the remaining designations within the block IC101) an input 1 which can be considered as a return or reset input. The function of this input is to reset the counter to the output 10 as soon as the signal or pulse on the input 1 is low, this no matter to which output the counter has been advanced. The input 16 is a supply input, whereas the input 15 is an advancement input and the inputs 8 and 13 are zeroizing or earthing inputs. The stepping device is advanced one step for each positive pulse on the advancement input 15. Moreover, as is shown on the drawing, the other side of each of the crystals associated with the eyes 21–29 are coupled, via points 1–9, to fixed contact points 1–9 in a rotary switch 30 which has been fixed contact points 0–10 and a movable contact arm which, via a resistor R106, is coupled to the base of a transistor T102. The switch 30 is used to select the number of eyes in which a thread is to run and which it is desired to detect. With the switch in the illustrated position, a thread shall pass through all ten eyes which transmit a signal to the signal indication apparatus in order that the relay coil L shall be maintained current-energized. When the switch arm is set at the contact point 0, the signal indicaton apparatus receives a signal representing thread-movement, so that the relay coil L is maintained current-energized. This signal is obtained from the voltage input +5V and is supplied via the resistors R104 and R106, the contact arm in the switch 30, the contact point 0, the connecting point A and the resistor R1 to the base of a transistor T5 in the signal indication apparatus. When the switch arm is in communication with the fixed contact point 0, the transistor T102 will, moreover, be operative as will a further transistor T103 connected to the input 1 of the counter IC101. The collector of this transistor will be low so that the counter IC101 is reset to the output 10. In this way, it will be ensured that the counter IC101 always begins at the first eye 20 once the switch 30 has been set at contact point 0.

The base of the transistor T102, which is a PNP transistor, is coupled to a voltage input at +5V via a resistor R104, the voltage input being coupled to the emitter of the transistor T102 via a resistor R105 and to the input 16 of the stepping device. Furthermore, the voltage input +5V is coupled to the zero plate or to earth via a condenser C104, and to the collector of the transistor T101, as well as to the base of the transistor 101 via a resistor 103, the base of the transistor being coupled to the zero plate via a resistor R102. The emitter of the transistor T101 is coupled to the zero plate via a resistor R101 and to the output of the signal transmitter via a condenser C101. Furthermore, the base of the transistor T102 is coupled to the connection point C via a condenser 102 and collector via a resistor R107. The collector of the transistor R102 is, furthermore, coupled to the base of a transistor T103, which, like the other transistors with the same symbol, is an NPN transistor, whose emitter is coupled to the connection point C and whose collector is coupled to the input 1 of the stepping device. When the transistor T103 becomes operative, its collector will, as was mentioned above, below and resetting or return of the stepping device to the output 10 will take place, whereupon a renewed stepping will be effected. If the switch 30 were to be set at the contact point 3, the stepping device would be reset to the output 10 as soon as it were switched to the output 6.

As was mentioned earlier, a positive pulse at the input 15 is required for the advancement of the stepping device. This is obtained in the form of a clock pulse via the connecting points I and C via a pulse limiter in the form of a pair of Schmitt-trigger coupled transistors T104 and T105. The connection point I is coupled to the base of the transistor T105 via a resistor R112 and the connection point C is coupled to the base of transistor T105 via a condenser C103 and a parallel-coupled resistor R111, and to the emitter of the transistor T105 via a resistor R110. The emitter of the transistor T105 is coupled to the emitter of the transistor T104. The base of the transistor T104 is coupled to the collector of the transistor T105, whereas the collector of the transistor T105 is coupled to the voltage input at +5V via a resistor R109 and the collector of the transistor T104 is coupled to the voltage input +5V via a resistor R108 and to the advancement input 15 of the stepping device. The necessary positive stepping pulse is obtained at the connection point I and can also be considered as a clock pulse. At the occurrence of a positive pulse or clock pulse at the connecting point I, the transistor T105 will be conducting and the transistor T104 will be non conducting, as a result of which a positive pulse will occur at the input 15. The Schmitt-trigger circuit formed by the transistors T105 and T014 serves the make the edges of the positive pulse steeper. Thus, it is the positive pulse supplied to the connecting point I which constantly guides the advancement of the counter or the stepping device; and it is the switch 30 which constantly determines the output to which the stepping device is to be advanced.

The signal transmitter is coupled to the signal indication apparatus via connection point A which leads to a connection between a resistor R1 and a condenser C2. The other side of the condenser C2 is coupled to the base of a transistor T1, whose base is coupled to the connection point H via a resistor R3 and to the connection point F via a resistor R2. The point F is, furthermore, coupled to earth or to the zero plate via a condenser C1. The emitter of the transistor T1 is coupled to the connection point H via a resistor R5 and a thereto parallel-coupled condenser C4 and to the connection point F via a resistor R4 which is a variable reisstor and whose sliding contact is coupled via a condenser C3 to the base of a transistor T2 which is coupled to the connection point F via a resistor R6 and to the connection point H via a resistor R7. The emitter of the transistor T2 is coupled to the connection point H via a resistor R9 and a thereto parallel-connected condenser C5. The collector of the transistor T2 is coupled to the connection point F via a resistor R8 and to the base of the transistor T3 via a condenser C6. Furthermore, the base of the transistor T3 is coupled to the connection point F via a resistor R10 and to the connection point H via a resistor R11, the collector is connected to connection point F via a resistor R11, to the base of a transistor T4 via a condenser C9 and to the connection point H via a condenser C8 and the emitter is coupled to the connection point H via a resistor R13 which is parallel-connected to a condenser C7. The base of the transistor T4 is coupled to the connection point H via a resistor R14, the emitter is coupled to the connection point H and the collector to the collector of the transistor T5, whose base is coupled to the connection point H via a resistor R29 which is parallel-connected to a condenser C10 and to the other side of resistor R1. The connection between the collectors of the transistors T4 and T5 is coupled to the connection point E via a diode D1 and a resistor R15 coupled in series thereto and a diode D2 coupled in parallel thereto in series with a resistor R17. The doides D1 and D2 are placed so as to face the collectors of the transistors T4 and T5. The connection between the diode D1 and the resistor R15 is coupled, via a resistor R16, to the anode of a programmable unijunction transistor T7 whose cathode is coupled to the connection point H and whose control electrode is coupled to the connection between two resistors R22 and R23. Furthermore, the anode of the transistor is coupled to the zero plate via a condenser C12 and to the connection point F via a resistor R25 and a diode D3 coupled in series therewith, and a resistor R26 coupled in series with the diode. It should, here, be observed that the diode D3 is placed so as to face the one base of the transistor T7. The connection between the diode D2 and the resistor R17 is coupled to the connection point H via a resistor R18 and a condenser C11. The connection between the resistor R18 and the condenser C11 is coupled to the anode of a further programmable unijunction transistor T6 whose cathode is coupled to the connection point H via a resistor R19 and to the connection point D via a diode D5 which is facing away from the cathode of the transistor T6. The control electrode of the transistor T6 is coupled to the connection point F via a resistor R20 and to the connection point H via a resistor R21. The connection between the resistors R23 and R24 is coupled to the base of a transistor T8 whose emitter is coupled to the connection point H and whose collector is coupled to the connection point F via the resistor R26, to the connection point G via a diode D4 which is facing away from the collector of the transistor T8, and to a base of a transistor T9 via a resistor R27. The collector of the transistor T9 is coupled to the connection point F via a resistor R28 and to the connection point H via a so-called light diode D6.

The operational method of the above-described signal indication apparatus is essentially as follows. The transistors T1, T2 and T3 form a signal amplifier and the signal received from the signal transmitter via the connection point A is amplified and impressed on the base of the transistor T4. The signal maintains the transistor T4 conducting. The transistor T4, the condenser C12 and the transistor T7 can be considered as forming a first long-term signal absence indicating circuit, while transistor T4, resistor R18, condenser C11 and transistor T6 form a short-term signal absence indicating circuit. The first-mentioned circuit operates in such a way that as long as the transistor T4 is kept conducting by means of the signal at its base, the charging of the condenser C12 to the voltage level necessary to cause the transistor T7 to be conducting will be prevented. As soon as the transistor T7 becomes conducting the light diode D6 will ignite and indicate a long-term signal absence. Once the transistor T7 becomes conducting because of the long-term signal absence, the signal at the connection between the resistors R22 and R23 will become low, the transistor T8 will become nonconducting and maintenance current will be established to the transistor T7 via the diode D3 and the resistor R25. In this way, the transistor T8 will become non-conducting and the transistor T9 will become conducting, whereby the light diode D6 is kept alight. In view of the fact that the connection between the resistor R26 and the diode D3 is high, the signal at the output from the diode D4 will be high, which entails that the relay controlled by the relay coil L falls and causes an operational stoppage, as will be described in greater detail below. The time constant of the condenser C12 determines the period of time during which the signal from the signal transmitter must be absent in order that the relay shall fall. The short-term signal absence indicating circuit with the transistor T4, the condenser C11 and the transistor T6 operates, in principle, in exactly the same way, although the condenser C11 has a considerably shorter time constant and the transistor T6 will become conducting at a considerably lower voltage level than will the transistor T7. In the event of a short-term signal absence, the transistor T4 will become non-conducting and charging of the condenser C11 will be permitted, the condenser C11, after charging to a certain predetermined voltage level, permitting the transistor T6, to become conducting, whereby a signal occurs at the output of the diode D5 on the connection point D, which signal delays the generation of a clock pulse or a stepping pulse.

The connection point F is coupled to a voltage input at 13V and to the base of a transistor T43 via a resistor R44, to the collector of a transistor T40, to the collector of a transistor T41 via a resistor R40 and to the collector of a transistor T51 via a resistor R68. The emitter of the transistor T40 is coupled to the connection point E and the base to the collector of the transistor T41. The emitter of the transistor T41 is coupled to the zero plate or to earth and the base to the zero plate or to earth via a resistor R42, to the zero plate or to earth via a condenser C40 and to the connection point G via a resistor R41. The connection point G is, furthermore, coupled to the base of a transistor T42 via a resistor R43 and a resistor R70 in series with the resistor R43. The base of the transistor T42 is coupled to the connection point H via a resistor R45 and the collector is coupled to the base of the transistor T43, whereas the emitter is coupled direct to the connection point H. The collector of the transistor T43 is coupled to one side of the relay coil L and to a voltage input at 24V via a diode D41 which is facing away from the collector of the transistor T43. The emitter of the transistor T43 is coupled to the connection point H. The other side of the relay coil is coupled to the voltage input at 24V. The connection point G is, further, coupled to the base of a transistor T51 via a resistor R46. The emitter of the transistor T51 is coupled to the base of a transistor T52 via a resistor R69. The collector of the transistor T52 is coupled to the voltage input at 24V via a lamp LA and the emitter is coupled to the connection point H. Furthermore, the connection point G is coupled to the connection point D via a diode D42 and a resistor R47 coupled in series therewith, the diode D42 being turned so as to face away from the connection point G which is also connected to the collector of a transistor T50, the emitter of the transistor T50 being coupled to the connection point H and the base being coupled to the connection point H via a resistor R67 and to the connection point F via a condenser C45 and a resistor R66 coupled in series with. The connection between the resistor R66 and the condenser C45 is coupled to the collector of a transistor T49 which, in turn, is coupled to the connection between the resistors R43 and R70 via a diode D43 which is facing away from the collector of the transistor T49. The emitter of the transistor T49 is coupled to the connection point H and the base is coupled to the connection between two resistors R64 and R65 the resistor R65 being coupled to the connection point H and the resistor R64 being coupled to the connection point F via a resistor R63. The connection between the resistors R63 and R64 is coupled to the control electrode of a programmable unijunction transistor T48, whose anode is coupled to the connection point H via a resistor R62 and a condenser C44 coupled in series therewith, and whose cathode is coupled direct to the connection point H. The connection between the resistor R62 and the condenser C44 is coupled to the collector of a transistor T47 via a resistor R61. Furthermore, the collector of the transistor T47 is coupled to the connection point F via a resistor R60 and a variable resistor R59 coupled in series therewith. The emitter of the transistor T47 is coupled to the connection point H via a condenser C43 and to the switch J via a resistor R58. When the switch J is closed, a connecton is effected between the resistor R58 and the connection point H. The base of the transistor T47 is coupled to the connection point F via a resistor R56 and to the connection point H via a diode D44 and a condenser C42 coupled in series therewith. The diode D44 is turned so as to face away from the base of the transistor T47. The connection between the diode D44 and the condenser C42 is coupled to a resistor R57 whose other end may be coupled to the alternative switch K.

The section of the circuit described below is in the circuit pulse formation section. The collector of the transistor T46 is coupled to the connection point I and the connection point F via a resistor R55. The emitter of the transistor T46 is coupled to the connection point H and the base is coupled to the connection point H via a resistor R54 and to the connection point F via a resistor R53 and a resistor R52 coupled in series therewith. The connection between the resistors R52 and R53 is coupled to the control electrode of a programmable unijunction transistor T45. The anode of the transistor T45 is coupled to the collector of the transistor T44 via a resistor R51 and the cathode is coupled to the connection point H. The collector of the transistor T44 is, further, coupled to the connection point H via a condenser C41 and to the connection point F via a resistor R48 and a variable resistor R49 coupled in series therewith. The emitter of the transistor T44 is coupled to the connection point H and the base is coupled to the connection point H via a resistor R50 and the connection point D. It should here be observed that the connection points C and H can be considered as the same connection point.

Once the machine provided with the apparatus described above is put in operation, it is necessary to keep the apparatus out of action until such time as the signal from the signal transmitter can be expected to be sufficiently high or great to keep the transistor T4 conducting. This time delay is achieved by means of the circuit R59, C44 and T48 and the length of the time delay can be adjusted by means of the resistor R59.

When the machine and the apparatus are set in operation the switch J is opened to the illustrated position and, in the alternative, the switch K is closed to the illustrated position. By opening the switch J the transistor T47 will be non-conducting and charging of the condenser C44 is permitted. When the condenser C44 has been charged to the voltage level necessary for igniting the transistor T48, this transistor is ignited and will be operating, whereby the voltage at the connection between the resistor R63 and R64 will be low so that the transistor T48 will then be kept in a conducting condition. Because the base voltage to the transistor T49 disappears, this transistor will become non-conducting and will permit charging of the condenser C45 which gives a short-term positive pulse to the base of the transistor T50, whereby this will be short-term conducting and will lower the voltage at the connection point G. When the connection point G becomes low, the maintenance current via the diode D3 and the resistor R25 to the transistor T7 will disappear, the transistor T7 becoming non-conducting, whereby the connection between the resistor R25 and R23 will be high so that the transistor T8 will become conducting and will thereby keep the connection point G low. Because the connection point G receives a low potential, the transistor T42 will become conducting and the transistor T43 will become conducting, so that the relay coil L will be energized with a current and the relay will be kept in the on-state. The short-term negative pulse at the collector of the transistor T50 goes further to the base of the transistor T44 via the diode D42 and the resistor R47, so that the transistor T44 will become non-conducting and the clock pulse or stepping pulse oscillator T45, T46 will be started. The first stepping pulse or clock pulse is not received until after a certain time delay which is determined by the time constant of the condenser C41 which is determined by means of the resistor R49. When the voltage of the condenser C41 has reached a sufficient level for ignition of the transistor T45, the voltage at the connection between the resistors R52 and R53 will become low, the collector voltage of the transistor T46 becoming high only as long as the condenser C41 discharges, which takes approximately 20 $\mu$s. It should here be observed that the first clock pulse or stepping pulse occurs approximately 6 ms after the occurrence of the short-term negative pulse at the collector of the transistor T50, which in its turn occurs approximately 2–8 s after the opening of the switch J. At the occurrence of the first stepping pulse at the connection point I and thereby at the advancement input 15 the advancement of the stepping device will be effected from the output 10 to the output 9.

Figure 2A:
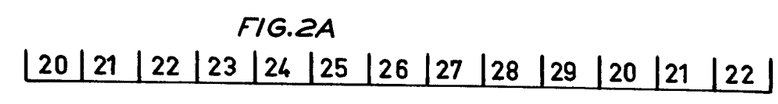
FIGS. 2A–2F show a diagram of signals from different points in the apparatus during one and the same signal state from the signal generating devices.
Figure 2B:
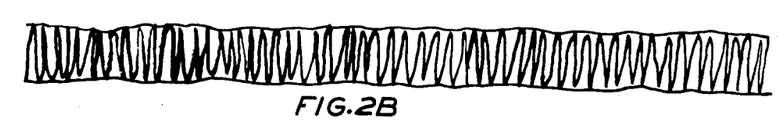
Figure 2C:
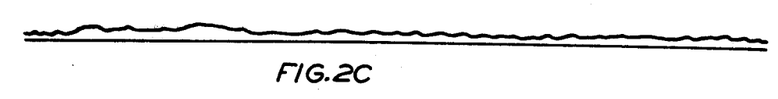
Figure 2D:
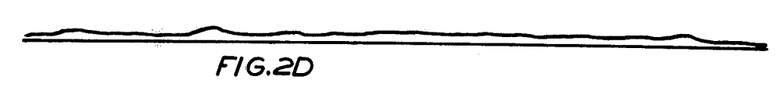
Figure 2E:
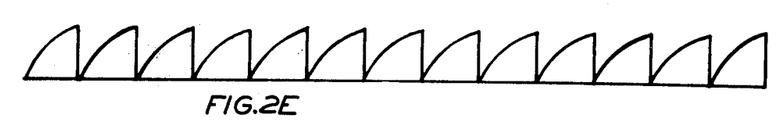
Figure 2F:
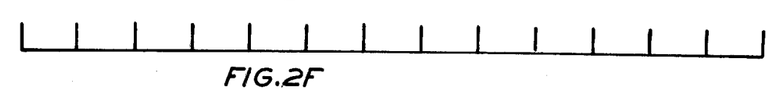

Reference is made, in the continued description of the operational method, to FIGS. 2A–2F and FIGS. 3A–3F. FIG. 2A illustrates the ten eyes 20–29 and once again 20–22. Thus, the stepping device has been advanced as far as to the eye 29 and then returned to the eye 20 and has then been advanced further to eyes 21 and 22. FIG. 2B shows the signal occurring at the output of the signal transmitter, if all of the ten threads are fault-free and are fed through the eyes continuously and evenly. FIG. 2C shows the signal at, for example, the condenser C12 and FIG. 2D shows the signal at the condenser C11. FIG. 2E shows the signal at the condenser C41 and FIG. 2F shows the signal at the collector of the transistor T46 or at the connection point I. Naturally, the signal is identical at the input 15. As long as the signal shown in FIG. 2B occurs at the input to the signal indication apparatus, no changes are made and the relay is kept in the on-state in that the relay coil L is operative, and the light diode D6 is kept unignited as is the lamp LA. Because the stepping pulses in FIG. 2 occur at an interval of approximately 6 ms, the stepping device IC101 or the counter IC101 is advanced from output to output each sixth ms.

Figure 3A:
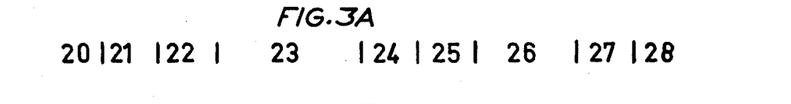
FIGS. 3A–3F show a diagram similar to that of FIG. 2 but with different signal states from the signal generating devices.
Figure 3B:
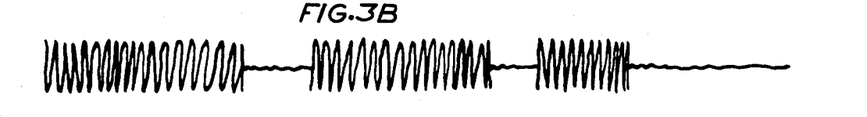
Figure 3C:
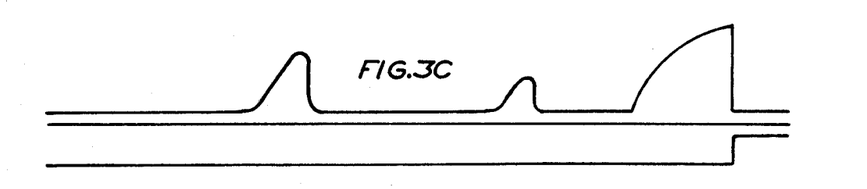
Figure 3D:
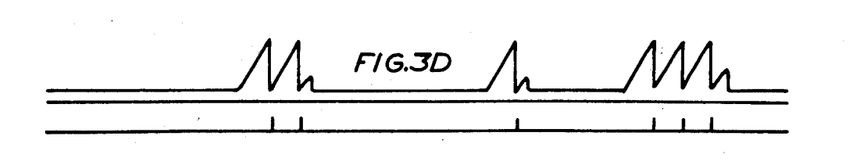
Figure 3E:
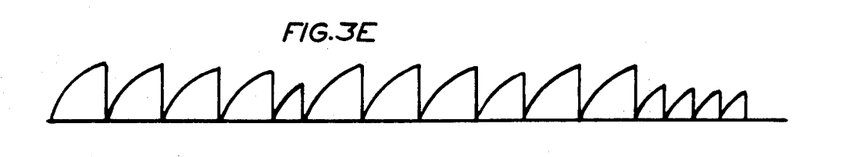
Figure 3F:
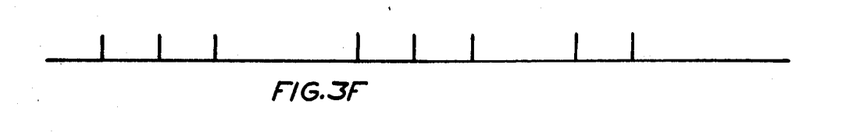

FIG. 3A illustrates the eyes 20–28 once again and FIG. 3B shows the signal from the signal transmitter. FIG. 3C shows the signal at the condenser C12 and FIG. 3D shows the signal at the condenser C11. FIG. 3E shows the signal at the condenser C41 and FIG. 3F shows the signal at the collector of the transistor T46 and therewith at the connection point I.

A complete signal is obtained from the eyes 20–22 and their associated crystals, but an incomplete signal is obtained from the eye 23 because of the fact that the thread is not fed evenly through the eye but jumps out for some reason or another. As a result, the signal at the input to the signal indication apparatus will disappear for a short time, whereby the transistor T4 will be non-conducting as long as the signal from the eye 23 disappears. As a result, charging of the condensers C12 and C11 is permitted. The condenser C12 is charged in accordance with FIG. 3C but not sufficiently to reach the ignition voltage of the transistor T7. The condenser C11 is charged in accordance with FIG. 3D and the ignition voltage of the transistor T6 is reached twice, whereby the condenser C41 is caused to discharge twice before it has reached the ignition voltage of the transistor T45, such that the generation of a stepping pulse or clock pulse is delayed, as is illustrated in FIG.

3F. Before the condenser C12 has been charged an amount sufficient to ignite the transistor T7, the signal from the eye 23 will reappear, whereby the transistor T4 once again become conducting and will prevent discharge of the condensers C11 and C12. After the advancement of the counter IC101 to the eye 26, a new, short-term signal absence will occur, which results in a delay of the generation of the next counting pulse. After receipt of the counting pulse, the counter is advanced to the eye 27 and the next counting pulse will realise advancement to the eye 28, from which no signal is obtained, whereupon the transistor T4 becomes non-conducting, the counting pulse delay comes into operation, as shown in FIG. 3D and the condenser C12 is fully charged to the ignition voltage of the transistor T7, whereby the transistor T7 is ignited and receives maintenance current via the diode D3 and the resistor R25. Furthermore, the transistor T8 will become non-conducting and T9 will become conducting so that the light diode D6 is ignited. Because T8 becomes non-conducting its collector will be high and consequently so will the output of the diode D4, which entails that the transistors T42, T51 and T52 will become conducting so that the lamp LA is ignited, the transistor T43 becomes non-conducting so that the relay L falls. Furthermore, the transistor T41 will be conducting and T40 non-conducting which entails that all of the signal indication apparatuses coupled to this trigger circuit will be prevented from entering into operation since neither of the condensers C11 or C12 in them receives charging current.

In view of the fact that the diode D6 ignites, it is easy for an operator to find out which of the signal transmitters has a thread breakage. Moreover, once the relay falls, the switch J will be closed, and, after a renewed start, the switch J will be opened and provide the previously described energization or resetting of the apparatus.

Figure 4:
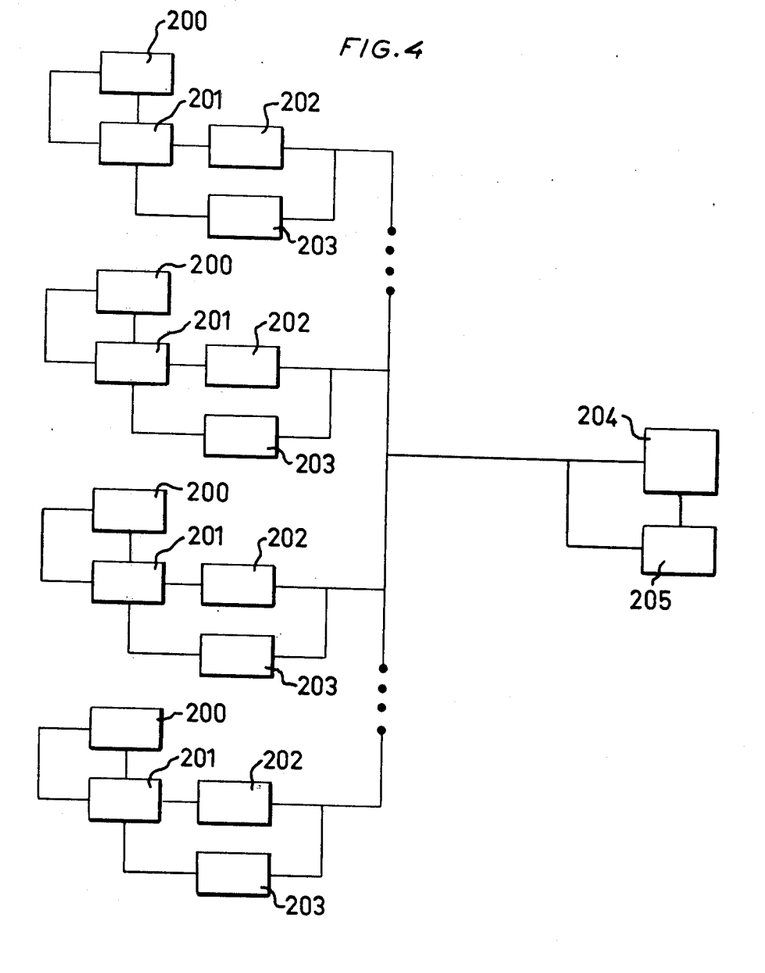
FIG. 4 shows a block diagram of an application of apparatuses according to the present invention.

In many cases it can be desirable to watch over a very large number of threads. In this case it is advisable to couple in parallel a plurality of the signal generating devices heretofore described and the signal indication apparatus associated therewith; these, in FIG. 4 being designated 200 and 201, respectively. In FIG. 4 are shown four parallel-coupled signal transmitters 200, but any given number can be coupled together. The signal transmitters are each coupled, via their bistable circuit 202 to a common trigger section 204, which can also be of the type heretofore described. As earlier, a resetting device 205 is associated to the trigger section 204, the resetting device being also connected to the input of the trigger section and thereby to each one of the bistable circuits 202. A blocking circuit 203 is coupled between the output of the bistable circuit 202 and the signal indication apparatus 201. The circuit described above operates as follows. The bistable circuits 202 are constructed such that they are switched from one state to the other state if the signal from the signal indication apparatus 201 disappears because of a thread breakage in any one of the eyes 20–29 or the number of eyes adjusted by the switch 30. When all of the bistable circuits 202 are in their one state all of the detected threads are whole and the signal to the trigger section 204 is high, but when any of the bistable circuits 202 are switched to the other state in the event of a thread breakage, the signal to the trigger section will be low, thus occasioning a release and all of the blocking circuits 203 are activated and block the unswitched bistable circuits 202 in their one state by preventing their associated signal indication apparatuses from indicating a thread breakage. After a release, the trigger section 204 and the blocking circuits 203 will be reset, as will the bistable circuit 202 which was switched to the second state in that the signal on the line between the trigger section 204 and the bistable circuits 202 and the blocking circuits 203 is made high by means of the resetting device 205. By means of the embodiment of the invention described above and illustrated in FIG. 4 any number of signal transmitters whatsoever can be coupled to a single signal line and a single trigger section. Apart from the signal line, only a supply line and a zero line will be required for the illustrated and described coupling together. Thus, the invention permits any number of signal transmitters whatsoever to be coupled together by means of only three lines.

The apparatus described above and illustrated in the drawings can be supplied from any suitable mains assembly which gives the indicated voltages with the required stability.

All embodiments within the scope of this specification and/or the appended claims are comprehended within the scope and spirit of this invention. The above embodiment of the invention was described for purposes of illustration rather than limitation, all variations and modifications of the invention are understood as being included within the scope thereof.

What I claim is:

1. Apparatus for detecting the movement, at a pre-determined point, of one or more objects, for example, threads, strips or the like, the apparatus including a signal generating device for each object, said devices being arranged to generate an electric signal in the presence of the object at said pre-determined point, wherein said signal generating devices are coupled one-at-a-time to a signal indication apparatus by means of an input coupling device.

2. Apparatus as claimed in claim 1, wherein said input coupling device includes a stepping device with an output for each signal generating device, an advancement input and an input for return to the first step.

3. Apparatus as claimed in claim 2, wherein a switch is provided between said signal generating devices and said stepping device in order, at the return input of said stepping device, to generate a return signal when the number of signal generating devices selected by means of said switch has been coupled to said signal indication apparatus.

4. Apparatus as claimed in claim 2, wherein a pulse generating device is coupled to the advancement input of said stepping device in order to generate thereon an advancement pulse each time it is desired to advance said stepping device.

5. Apparatus as claimed in claim 4, wherein said signal indication apparatus is coupled to said pulse generating device to delay the generation of an advancement pulse.

6. Apparatus as claimed in claim 5, characterized in that said signal indication apparatus includes a first signal absence indicating circuit and a second signal absence indicating circuit, the first of which circuits is coupled to an apparatus for indicating long-term signal absence from the coupled-in signal generating device and the second is coupled to said pulse generating device to delay its generation of an advancement pulse in the event of short-term signal absence from the coupled-in signal generating device.

7. Apparatus as claimed in claim 1, wherein the outputs of said signal generating devices are coupled to each other and to the input of said signal indication apparatus via an emitter follower, and the inputs are coupled each to an output of said stepping device and to the switch, apart from the input of the first signal generating device, if there are several such signal generating devices.

8. Apparatus as claimed in claim 7, wherein said switch is a switch with a first contact point, a plurality of second contact points and a contact means for establishing communication between said first contact point and any one of said plurality of second contact points, of which one is coupled to said signal indication apparatus in order to supply a signal thereto which deenergize the apparatus, and the remainder are each coupled to an input of said signal generating devices apart from the input of the first of said signal generating devices, if there are several of said signal generating devices, and wherein said contact means is coupled to a return input of said stepping device for the generation of a return signal when said stepping device has been advanced to that output which is coupled to the same input as one of the other contact points in said switch.

9. Apparatus as claimed in claim 4, wherein a pulse limiting circuit, preferably a Schmitt-trigger is coupled in between the advancement input of the stepping device and the pulse generating device.

10. Apparatus as claimed in claim 9, wherein an energization device is coupled to said pulse generating device to cause the same to commence, after a certain time delay, the generation of advancement pulses on actuation of the apparatus, and to make an apparatus which triggers operational stoppage sensitive to the signal indication apparatus after operational stoppage or indication of a long-term signal absence.

11. An apparatus as claimed in claim 1, wherein a plurality of signal indication apparatuses are coupled to a signal line via a bistable circuit and a blocking circuit, the signal line is coupled to a device triggering operational stoppage, said signal line displaying a high signal level until such time as a bistable circuit is switched, on indication of a thread breakage in any of the signal indication apparatuses, from one state to the other state, whereupon the signal level will be low, so that the trigger device occasions an operational stoppage and all of the blocking circuits block the remaining signal indication apparatuses.

12. Apparatus as claimed in claim 1, wherein a switch is provided between said signal generating devices and said stepping device in order, at the return input of said stepping device, to generate a return signal when the number of signal generating devices selected by means of said switch has been coupled to said signal indication apparatus.

13. Apparatus as claimed in claim 1, wherein said signal indication apparatus is coupled to said pulse generating device to delay the generation of an advancement pulse.

14. Apparatus as claimed in claim 1, characterized in that said signal indication apparatus includes a first signal absence indicating circuit and a second signal absence indicating circuit, the first of which circuits is coupled to an apparatus for indicating long-term signal absence from the coupled-in signal generating device and the second is coupled to said pulse generating device to delay its generation of an advancement pulse in the event of short-term signal absence from the coupled-in signal generating device.

15. Apparatus as claimed in claim 1, wherein said switch is a switch with a first contact point, a plurality of second contact points and a contact means for establishing communication between said first contact point and any one of said plurality of second contact points, of which one is coupled to said signal indication apparatus in order to supply a signal thereto which deenergize the apparatus, and the remainder are each coupled to an input of said signal generating devices apart from the input of the first of said signal generating devices, if there are several of said signal generating devices, and wherein said contact means is coupled to a return input of said stepping device for the generation of a return signal when said stepping device has been advanced to that output which is coupled to the same input as one of the other contact points in said switch.

16. Apparatus as claimed in claim 2, wherein said signal indication apparatus is coupled to said pulse generating device to delay the generation of an advancement pulse.

17. Apparatus as claimed in claim 2, wherein the outputs of said signal generating devices are coupled to each other and to the input of said signal indication apparatus via an emitter follower, and the inputs are coupled each to an output of said stepping device and to the switch, apart from the input of the first signal generating device, if there are several such signal generating devices.

18. Apparatus as claimed in claim 2, wherein said switch is a switch with a first contact point, a plurality of second contact points and a contact means for establishing communication between said first contact point and any one of said plurality of second contact points, of which one is coupled to said signal indication apparatus in order to supply a signal thereto which deenergize the apparatus, and the remainder are each coupled to an input of said signal generating devices apart from the input of the first of said signal generating devices, if there are several of said signal generating devices, and wherein said contact means is coupled to a return input of said stepping device for the generation of a return signal when said stepping device has been advanced to that output which is coupled to the same input as one of the other contact points in said switch.

19. Apparatus as claimed in claim 3, wherein the outputs of said signal generating devices are coupled to each other and to the input of said signal indication apparatus via an emitter follower, and the inputs are coupled each to an output of said stepping device and to the switch, apart from the input of the first signal generating device, if there are several such signal generating devices.

20. Apparatus as claimed in claim 3, wherein said switch is a switch with a first contact point, a plurality of second contact points and a contact means for establishing communication between said first contact point and any one of said plurality of second contact points, of which one is coupled to said signal indication apparatus in order to supply a signal thereto which deenergize the apparatus, and the remainder are each coupled to an input of said signal generating devices apart from the input of the first of said signal generating devices, if there are several of said signal generating devices, and wherein said contact means is coupled to a return input of said stepping device for the generation of a return signal when said stepping device has been advanced to that output which is coupled to the same input as one of the other contact points in said switch.

21. Apparatus as claimed in claim 4, wherein an energization device is coupled to said pulse generating device to cause the same to commence, after a certain time-delay, the generation of advancement pulses on actuation of the apparatus, and to make an apparatus which triggers operational stoppage sensitive to the signal indication apparatus after operational stoppage or indication of a long-term signal absence.

* * * * *